(12) United States Patent
Kuroiwa (10) Patent No.: US 9,075,829 B2
(45) Date of Patent: Jul. 7, 2015

(54) CLUSTERING APPARATUS, AND CLUSTERING METHOD

(75) Inventor: Yukiko Kuroiwa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 196 days.

(21) Appl. No.: 13/263,030

(22) PCT Filed: Apr. 8, 2010

(86) PCT No.: PCT/JP2010/056352
§ 371 (c)(1),
(2), (4) Date: Nov. 25, 2011

(87) PCT Pub. No.: WO2010/117031
PCT Pub. Date: Oct. 14, 2010

(65) Prior Publication Data
US 2012/0124048 A1   May 17, 2012

(30) Foreign Application Priority Data
Apr. 10, 2009  (JP) ................ 2009-095618

(51) Int. Cl.
*G06F 17/30*   (2006.01)
*G06Q 30/02*   (2012.01)

(52) U.S. Cl.
CPC ...... *G06F 17/3028* (2013.01); *G06F 17/30705* (2013.01); *G06Q 30/0201* (2013.01)

(58) Field of Classification Search
CPC .................................................. G06F 17/30
See application file for complete search history.

(56) References Cited

U.S. PATENT DOCUMENTS

| 4,813,074 A * | 3/1989 | Marcus ............ 704/254 |
| 2003/0032010 A1 * | 2/2003 | Selifonov et al. ....... G06F 17/30 |

(Continued)

FOREIGN PATENT DOCUMENTS

| JP | 2001-229177 | 8/2001 |
| JP | 2007-226568 | 9/2007 |

(Continued)

OTHER PUBLICATIONS

Etsuko Inoue, "A New Interactive Graph-Based VIsualization Method for Large-Scale Clustering Analyses", The IEICE transactions on Information and Systems (J92-D), No. 3, The IEICE Transactions on Information and Systems (Japanese Edition), Mar. 1, 2009, vol. J92-D, pp. 351 to 360.

(Continued)

*Primary Examiner* — Son T Hoang
(74) *Attorney, Agent, or Firm* — Young & Thompson (57) ABSTRACT

A technique extracts an object that is characteristic although the number of appearances is less demanded. A clustering apparatus includes: a similarity degree calculating section calculating a similarity degree of a combination of optional two of objects to store the calculated similarity degree in a similarity degree table, excluding a combination of one of the optional two and itself; a merging object selecting section selecting as merging objects, two objects related to the similarity degree which satisfies a predetermined reference; a new object generating section generating a new object from the merging objects; a merging object removing section removing from the similarity degree table, a similarity degree between each of the two objects selected as the merging objects and each of the objects; and a new object adding section calculating a similarity degree between the new object and each of the plurality of objects other than the new object.

10 Claims, 8 Drawing Sheets

(56) References Cited

U.S. PATENT DOCUMENTS

| | | | |
|---|---|---|---|
| 2008/0082531 A1* | 4/2008 | Suarez | 707/7 |
| 2008/0091630 A1* | 4/2008 | Bonissone et al. | 706/45 |
| 2010/0132039 A1* | 5/2010 | Ji et al. | 726/23 |

FOREIGN PATENT DOCUMENTS

| | | |
|---|---|---|
| JP | 2008-234482 | 10/2008 |
| JP | 2008-283412 | 11/2008 |

OTHER PUBLICATIONS

Kazunari Ishida, "On a statistical analysis of relation among documents in terms of terminology and a development of system to support the analysis", IPSJ SIG Notes, vol. 99, No. 57, IPSJ SIG Notes, Jul. 16, 1999, vol. 99, pp. 49 to 56.

Isao Namba, "Question Answering Retrieval for Log Using Pseudo Frequency", IEICE Technical Report, vol. 101, No. 712, IEICE Technical Report, Mar. 7, 2002, vol. 101, pp. 101 to 108.

Yukiko Fujiwara et al., "Kolmogorov Fukuzatsu Sei ni Motozuku Seihin Service no Kachi Hyoka", FIT2009, Sep. 4, 2009, pp. 55 to 62, http://www.sofken.com/FIT2009/pdf/F/RF_002.pdf, "Product/Service Value Validation based on Kolmogorov Complexity".

Li et al., "The Similarity Metric", (IEEE Transactions on Information Theory 2004 vol. 50, No. 12, Dec. 2004, pp. 3250-3264.

Kamishima, A Survey of Recent Clustering Methods for Data Mining (Part 1)—Try Clustering!—pp. 59-65, National Institute of Advanced Industrial Science and Technology (AIST), Nov. 8, 2002.

International Search Report, PCT/JP2010/056352, May 18, 2010.

* cited by examiner

| ID | CONTENTS |
|---|---|
| 1 | CANNOT UNDERSTAND WELL |
| 2 | NO OPINION |
| 3 | GOOD IN DESIGN AND FUNCTION BUT NOT GOOD IN HIGH PRICE |
| ⋮ | |
| N | NO |

Fig. 3

| | 1 | 2 | 3 | ··· | N |
|---|---|---|---|---|---|
| 1 | | | | | |
| 2 | 0.95 | | | | |
| 3 | 0.55 | 0.30 | | | |
| ⋮ | ⋮ | ⋮ | ⋮ | | |
| N | 0.80 | 0.90 | 0.40 | ··· | |

Fig. 4

| ID | CONTENTS |
|---|---|
|  |  |
|  |  |
| 3 | GOOD IN DESIGN AND FUNCTION BUT NOT GOOD IN HIGH PRICE |
| ⋮ |  |
| N | NO |

Fig. 5

|  | 1 | 2 | 3 | ⋯ | N |
|---|---|---|---|---|---|
| 1 |  |  |  |  |  |
| 2 |  |  |  |  |  |
| 3 |  |  |  |  |  |
| ⋮ |  |  | ⋮ |  |  |
| N |  |  | 0.40 | ⋯ |  |

Fig. 6

| ID | CONTENTS |
|---|---|
| 1 | CANNOT UNDERSTAND WELL, AND NO OPINION |
|  |  |
| 3 | GOOD IN DESIGN AND FUNCTION BUT NOT GOOD IN HIGH PRICE |
| ⋮ |  |
| N | NO |

Fig. 7

|  | 1 | 2 | 3 | ⋯ | N |
|---|---|---|---|---|---|
| 1 |  |  |  |  |  |
| 2 |  |  |  |  |  |
| 3 | 0.65 |  |  |  |  |
| ⋮ | ⋮ |  | ⋮ |  |  |
| N | 0.70 |  | 0.40 | ⋯ |  |

```
"WAKARANAI"(in kanji form)  →  "WAKARANAI"(in Japanese Hirakana form)
"NAI"(in kanji form)  →  "NAI"(in Japanese Hirakana form)
Personal Computer  →  perso-com
PC  →  perso-com
DEKIMASU  →  DEKIRU
DESITA  →  DATTA
```

Fig. 11

| ID | CONTENTS |
|---|---|
| 1 | CANNOT UNDERSTAND WELL |
| 2 | NO OPINION |
| 3 | GOOD IN DESIGN AND FUNCTION BUT NOT GOOD IN HIGH PRICE |
| ⋮ | |
| N | NO |

CLUSTERING APPARATUS, AND CLUSTERING METHOD

TECHNICAL FIELD

The present invention is related to a clustering apparatus, and a clustering method for objects such as document data, image data, and time-series data. Especially, the present invention is related to a clustering system, and a clustering method, in which analysis of customer's opinions in a market, a call center and so on, and extraction of a characteristic object in acquisition and analysis of requests of stakeholders are performed.

BACKGROUND ARTS

There is a case that opinions of many customers are collected in a market and a call center, the opinions are clustered into groups by aggregating similar opinions, and the group contents are analyzed every group. Also, in the acquisition of requests in a megaproject, similar requests are collected and clustered, and needs are extracted for every group. For example, the clustering can be carried out by calculating a similarity degree between every two documents based on an appearance frequency of each of words contained in the documents after morpheme analysis. For example, in Patent Literature 1, a method is described of expressing the document in the form of a vector by using the word appearance frequency and of calculating a similarity degree between the documents with a cosine similarity degree. Various methods of clustering are described in Non-Patent Literature 1.

Also, in Patent Literature 2, an apparatus is described in which the importance of customer needs is calculated by using a set key word and an evaluation value, when the customer opinions in a market and a call center should be analyzed. In Patent Literature 3, an apparatus is described in which a sentence/tag determination table is referred to extract a classification object sentence based on a key word, a terminology pattern description table is referred to extract a terminology, the expression difference of a word extracted through the morpheme analysis is eliminated, a classification pattern description table is referred to generate a classification pattern, and a classifying process is carried out based on the classification pattern.

Moreover, as a technique not using the morpheme analysis, a calculation method of a similarity degree between the objects based on Kolmogorov complexity is described in Non-Patent Literature 2. The similarity degree between the objects such as document data, image data, and time-series data can be calculated.

CITATION LIST

[Patent Literature 1]: JP 2008-234482A
[Patent Literature 2]: JP 2007-226568A
[Patent Literature 3]: JP 2001-229177A
[Non-Patent Literature 1]: "Clustering Technique in Data Mining Field (1)" (Artificial Intelligence Society Magazine 2003, Vol. 18, No. 1, pp. 59-65) by Toshihiro Kamishima
[Non-Patent Literature 2]: "The Similarity Metric" (IEEE Transactions on Information Theory 2004, Vol. 50, No. 12, pp. 3250-3264) by Ming

SUMMARY OF THE INVENTION

However, in the similarity degree calculating method used in Patent Literature 1, as the number of words increases, a significant solution cannot be obtained as described in Non-Patent Literature 1. Therefore, words which are considered to be unnecessary are previously excluded to decrease the number of words. However, words to be previously excluded, such as general words which are contained in most of the documents and the words which appear only in a few documents, tend to be mechanically excluded even if the words are important. Therefore, a similarity degree between objects which are characteristic but appear only in the few documents cannot be known. It is difficult to carry out the clustering to extract the characteristic objects when the number of times of appearance is less. Also, a composite word which contains a general word partially is mechanically excluded, and the clustering is carried out without using the composite word containing the general word, even if the composite word is important.

In Patent Literature 2, in order to carry out the clustering when the composite word containing the general word partially is important and where a word is characteristic, although the number of times of appearance of the word is less, a set key word and an importance are used. In this case, a user of a system must determine the key word previously. However, in addition to a load of the user of the system, it is not possible to carry out analysis by using the key word out of the assumption by the user of the system. Therefore, unless the user assumes previously, the object which is characteristic although the number of times of appearance is less cannot be extracted.

Also, in Patent Literature 3, in order to analyze by using a characteristic word, a key word and a tag corresponding to it are stored in a sentence/tag determination table, and a string, a concept, and a subconcept which are contained in each layer are used in a classification pattern description table. However, the key word in the sentence/tag determination table and the string, the concept, and the subconcept in the classification pattern description table must be previously determined by the user of the system, like Patent Literature 2. Therefore, analysis cannot be carried out by using a character string and a concept out of the assumption of the user of the system. Thus, unless the user assumes previously, an object which is characteristic although the number of times of appearance is less cannot be extracted. A technique which can extract an object which is characteristic although the number of times of appearance is less is demanded.

In Non-Patent Literature 2, in order to calculate not a distance but a similarity degree, a clustering method which can be theoretically applied is limited. For example, the single linkage method can be theoretically applied, but the clustering result becomes an arbitrary stair stepping structure due to the chaining effect, as described in Non-Patent Literature 1. Therefore, there is a problem that it is not possible to carry out the appropriate clustering. Also, the similarity degree calculated in Non-Patent Literature 2 undergoes influence due to the difference of expression due to mixture of different Japanese sentence expressions as well as regular transformation and synonym as described to Patent Literature 3. For this reason, there is a problem that it is not possible to cluster appropriately.

A clustering apparatus of the present invention includes: a similarity degree calculating section configured to calculate a similarity degree of a combination of optional two of objects to store the calculated similarity degree in a similarity degree table, excluding a combination of one of the optional two and itself; a merging object selecting section configured to select as merging objects, two objects related to the similarity degree which satisfies a predetermined reference; a new object generating section configured to generate a new object from the merging objects; a merging object removing section configured to remove from the similarity degree table, a similarity degree between each of the two objects selected as the merging objects and each of the objects; and a new object adding section configured to calculate a similarity degree between the new object and each of the plurality of objects other than the new object.

A clustering method of the present invention is achieved by calculating a similarity degree of a combination of optional two of objects to store the calculated similarity degree in a similarity degree table, excluding a combination of the optional object and itself; by selecting as merging objects, two objects related to the similarity degree which satisfies a predetermined reference; by generating a new object from the merging objects; by removing from the similarity degree table, a similarity degree between each of the two objects selected as the merging objects and each of the objects; and by calculating a similarity degree between the new object and each of the objects other than the new object.

A clustering program of the present invention for making a computer to attain: a similarity degree calculating function to calculate a similarity degree of a combination of optional two of objects to store the calculated similarity degree in a similarity degree table, excluding a combination of the optional object and itself; a merging object selecting function to select as merging objects, two objects related to the similarity degree which satisfies a predetermined reference; a new object generating function to generate a new object from the merging objects; a merging object removing function to remove from the similarity degree table, a similarity degree between each of the two objects selected as the merging objects and each of the objects; and a new object adding function to calculate a similarity degree between the new object and each of the objects other than the new object.

According to the present invention, the clustering system, the clustering method and the clustering program for objects such as document data, image data, and time-series data are provided. Especially, in case of analysis of the customer opinions in the market and the call center, and acquirement and analysis of requests of stakeholders, the clustering system, the clustering method and the clustering program are provided in that the object which is characteristic although the number of times of appearance is less can be extracted.

BRIEF DESCRIPTION OF THE DRAWINGS

The above and other objects, advantages and features of the present invention will be more apparent from the following description of certain embodiments taken in conjunction with the accompanying drawings, in which.

DESCRIPTION OF EXEMPLARY EMBODIMENTS

Hereinafter, exemplary embodiments of the present invention will be described with reference to the attached drawings.

First Exemplary Embodiment

Figure 1:
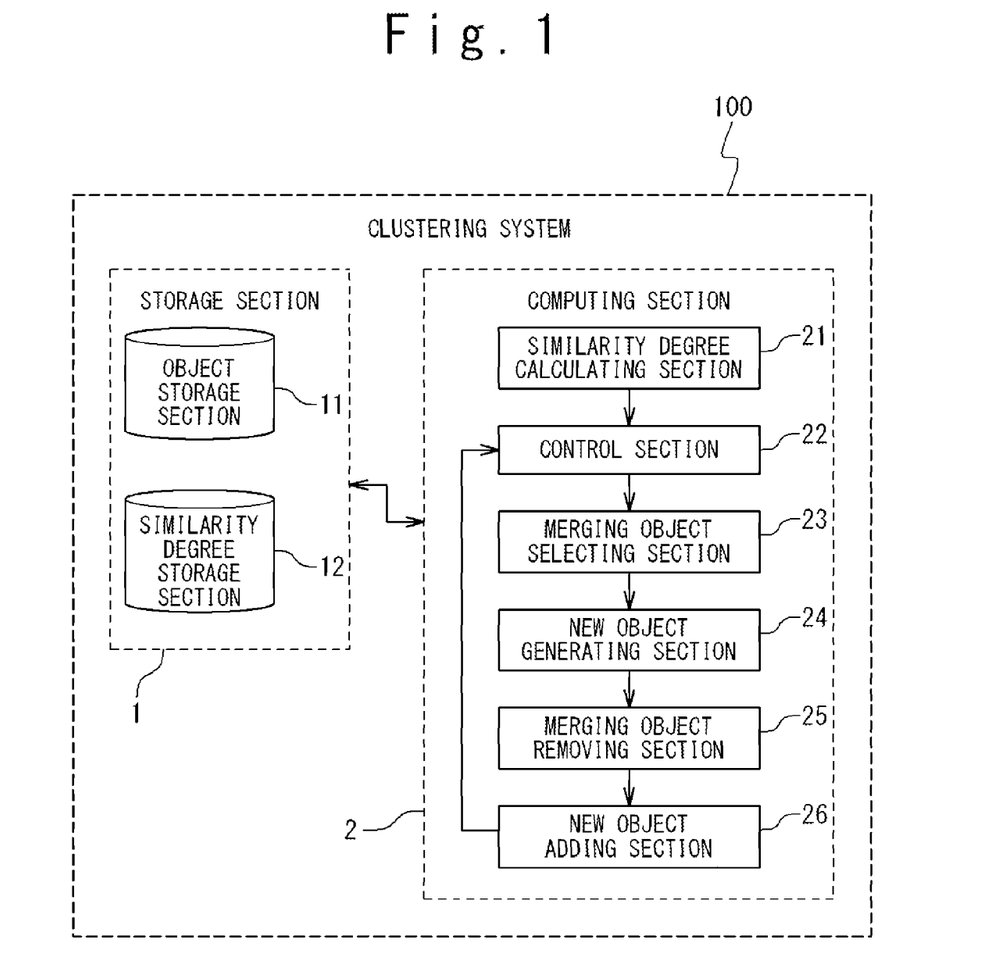
FIG. 1 is a block diagram showing a configuration of a clustering system according to a first exemplary embodiment of the present invention.

FIG. 1 is a block diagram showing a configuration of a clustering system according to a first exemplary embodiment of the present invention. The clustering system 100 of the present exemplary embodiment is provided with a storage section 1 and a computing section 2. The storage section 1 is provided with an object storage section 11 and a similarity degree storage section 12. The computing section 2 is provided with a similarity degree calculating section 21, a control section 22, a merging object selecting section 23, a new object generating section 24, a merging object removing section 25, and a new object adding section 26. It is possible to realize the clustering system by use of a computing apparatus such as a personal computer. The storage section 1 is realized by a storage unit such as a hard disk unit. The computing section 2 is a functional block realized by a CPU reading a program which has been stored in the storage section and executing an operation in accordance with a procedure described in the program.

Figure 2:
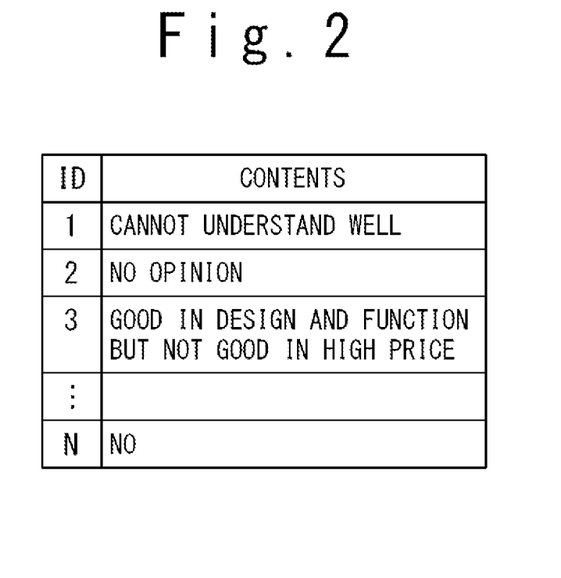
FIG. 2 is a diagram showing an example of an object stored in an object storage section 11.

A plurality of objects to be clustered are previously stored in the object storage section 11 of the storage section 1. The plurality of objects are such as document data, image data, and time-series data. These objects are rewritten as the clustering system operates. An example of the object stored in the object storage section 11 when the object is a document is shown in FIG. 2. As shown in FIG. 2, an ID showing an identifier for identifying an object and the contents of the object are stored in the object storage section 11. It should be noted that the object having the ID of i is referred to as an object i, hereinafter.

Figure 3:
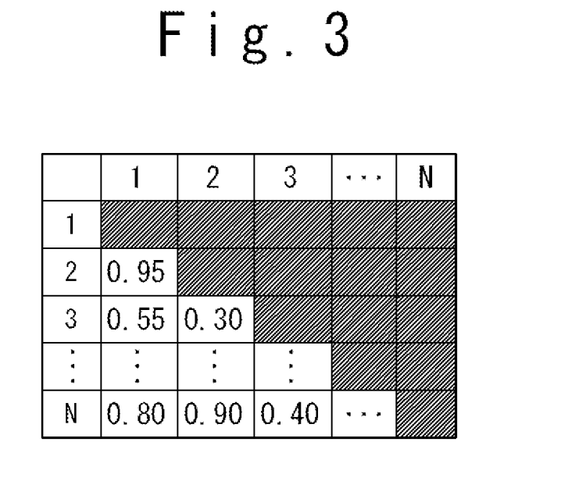
FIG. 3 is a diagram showing an example of a similarity degree table stored in a similarity degree storage section 12.

The similarity degree storage section 12 stores a similarity degree table. A similarity degree between optional two of the plurality of objects stored in the object storage section 11 is stored in the similarity degree table. An example of the similarity degree table is shown in FIG. 3. As shown in the FIG. 3, the similarity degree between the two objects is stored as a numerical value in the similarity degree table. Here, the similarity degree between the object i and the object i is not stored. Also, when the similarity degree of the object i to an object j in case of i≠j can be regarded as being same as the similarity degree of the object j to the object i, the similarity degree of the object j to the object i is not stored, if the similarity degree of the object i to the object j is stored.

The similarity degree calculating section 21 of the computing section 2 calculates a similarity degree between two of the plurality of objects stored in the object storage section 11 and stores the calculation result in the similarity degree storage section 12. The calculating method of the similarity degree is specified by a user of the system through an input unit such as a keyboard, or is specified based on another manner. Here, its own similarity degree as the similarity degree between the object i and the object i is not calculated. Also, when the similarity degree of the object i to the object j in case of i≠j can be regarded as being the same as the similarity degree of the object j to the object i, the similarity degree of the object j to the object i is not calculated for saving wasteful calculation, although the similarity degree of the object i to the object j is calculated. The similarity degree calculating section 21 calculates the similarity degrees between all combinations of every two of the objects except the above combinations.

The control section 22 checks whether or not an ending condition is met, and the operation is ended if being met, and the operation continues if not being met. Here, the ending condition is specified by the user of the system through the input unit such as a keyboard or it is specified by another manner.

The merging object selecting section 23 selects two objects from the objects stored in the object storage section 11 as merging objects based on the similarity degrees stored in the similarity degree storage section 12. For example, the merging object selecting section 23 selects documents having the largest similarity degree stored in the similarity degree storage section 12 as the merging objects. The new object generating section 24 generates a new object based on the two selected merging objects. For example, by concatenating or coupling the two merging objects, a new object is generated.

Figure 4:
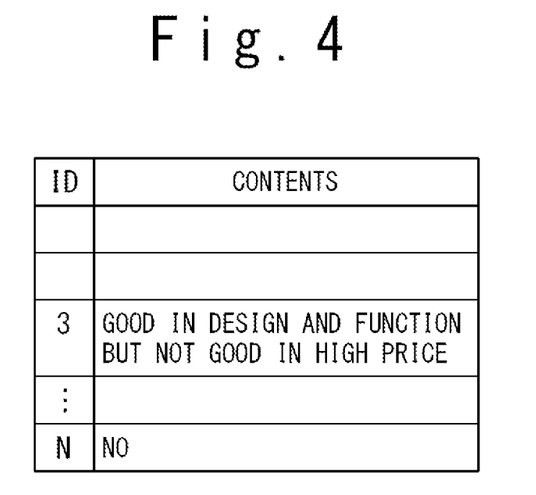
FIG. 4 is a diagram showing an example of the object storage section 11 when the object 1 and the object 2 are selected as merging objects.
Figure 5:
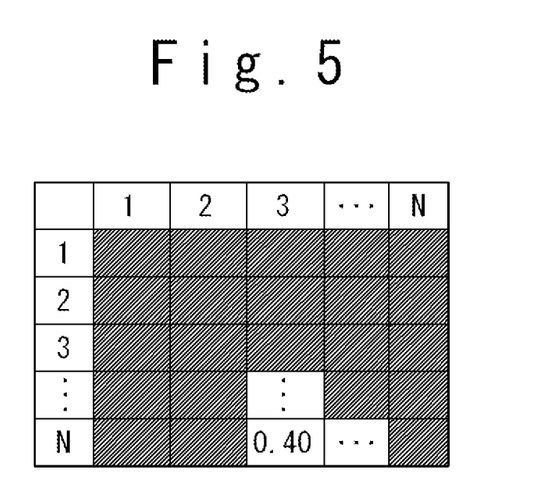
FIG. 5 is a diagram showing an example of the similarity degree storage section 12 when the object 1 and the object 2 are selected as the merging objects and the related similarity degrees are removed.

The merging object removing section 25 removes the similarity degree between the two objects selected as the merging objects from the object storage section 11. Moreover, the merging object removing section 25 removes the similarity degrees between each of the two objects selected as the merging objects and objects except it from the similarity degree table in the similarity degree storage section 12. Here, in FIG. 2, in a case where the objects of an object 1 and an object 2 are selected as the two merging objects, the object data stored in the object storage section 11 is shown in FIG. 4, and the similarity degree table stored in the similarity degree storage section 12 is shown in FIG. 5. As shown in FIGS. 4 and 5, the object 1 and the object 2 are removed from the object storage section 11 and the similarity degrees between the object 1 and other objects except the object 1 and the similarity degrees between the object 2 and other objects except the object 2 are removed from the similarity degree storage section 12.

Figure 6:
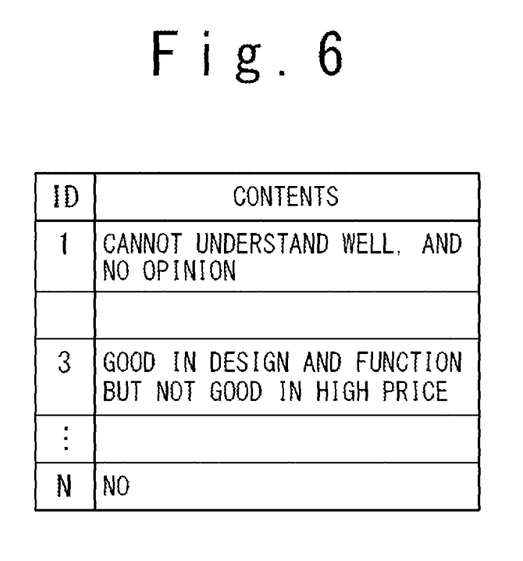
FIG. 6 is a diagram showing an example of the object storage section 11 when a new object obtained by coupling the object 1 and the object 2 is stored therein as the object 1.
Figure 7:
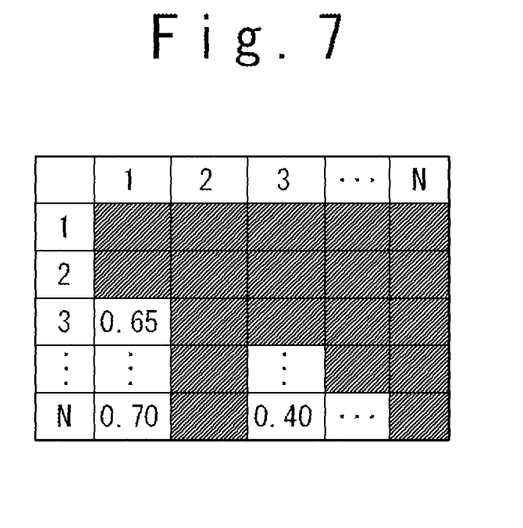
FIG. 7 is a diagram showing an example of the similarity degree storage section 12 when the new object obtained by coupling the object 1 and the object 2 is stored therein as the object 1.

The new object adding section 26 calculates a similarity degree between each of the plurality of objects stored in the object storage section 11 and the new object, and stores the calculated similarity degrees in the similarity degree storage section 12 and the new object in the object storage section 11. An example of the object stored in the object storage section 11 is shown in FIG. 6, and an example of the similarity degree table stored in the similarity degree storage section 12 is shown in FIG. 7. In FIG. 6, the new object obtained by connecting the two objects is stored in the object storage section 11 as the object 1. Also, a similarity degree of the new object 1 to object 3, a similarity degree of the new object 1 . . . , a similarity degree of the new object 1 to object N are calculated and stored in the similarity degree storage section 12, as shown in FIG. 7.

Figure 8:
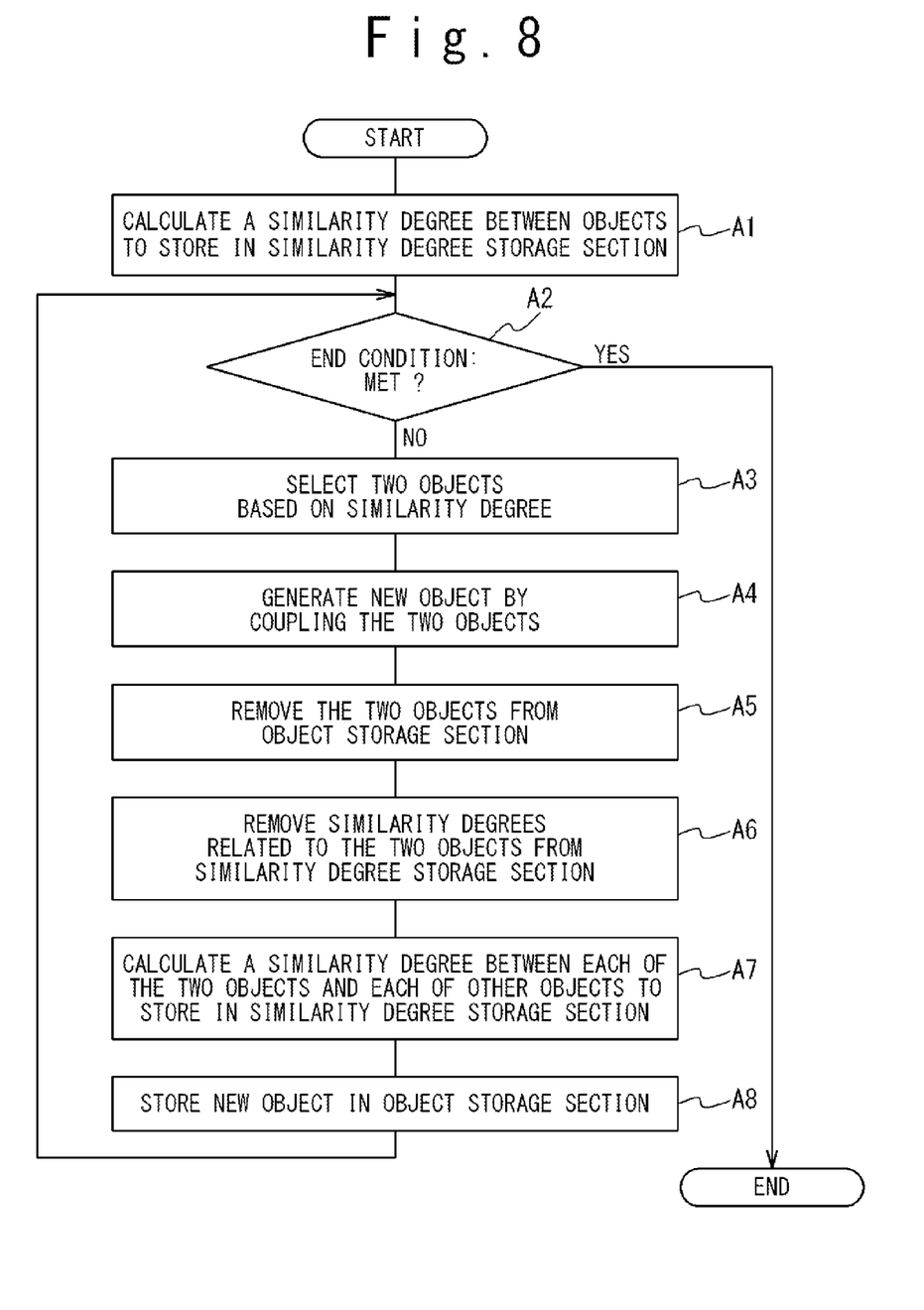
FIG. 8 is a flow chart showing an operation of the clustering system according to first exemplary embodiment of the present invention.

Next, an operation of the clustering system will be described. FIG. 8 is a flow chart showing an example of a process of the clustering system of the present exemplary embodiment. For example, a plurality of objects are stored in the object storage section 11 and when a method of calculation of a similarity degree and an ending condition are specified by the user of the system through the input unit such as the keyboard or are specified by the other manner, the clustering system operates as follows. Here, the N objects are supposed to be stored in the object storage section 11.

First, the similarity degree calculating section 21 calculates a similarity degree of each of pairs of objects stored in the object storage section 11 and stores the calculation result in the similarity degree storage section 12 (step A1 in FIG. 8). Here, a similarity degree of itself as a similarity degree between the object i and the object i is not stored. Also, when the similarity degree of the object i to the object j in case of i≠j can be regarded as being the same as the similarity degree of the object j to the object i, the similarity degree of the object j to the object i is not calculated and stored in order to avoid a wasteful calculation. A similarity degree of each of the other pairs of the objects is calculated and stored. A method of calculating a similarity degree is specified by the user of the system through the input unit such as the keyboard or is specified by the other manner.

An example of the method of calculating a similarity degree is shown. For example, it is supposed that a calculation method through compression is specified and an algorithm which compresses an object is specified. The size when the object i is compressed is C(i), the size when the object j is compressed is C(j), and the size when a new object obtained by coupling the objects i and j is compressed is C(ij). A similarity degree d(i, j) between the object i and the object j can be calculated by the following equations (1) and (2). These can be regarded as being possible to assume that these are approximation methods of Kolmogorov complexity.

$$d(i, j) = \frac{C(ij)}{C(i) + C(j)} \quad (1)$$

$$d(i, j) = \frac{C(ij)\min(C(i), C(j))}{\max\{C(i), C(j)\}} \quad (2)$$

For example, the specified compression algorithm is such as gip and zgip in case of the document and is an algorithm of conversion to png in case of the image.

Next, the control section 22 checks whether or not the ending condition is met, and ends the operation if being met and advances to step A3 if not being met (Step A2). Here, the ending condition is specified by the user of the system through the input unit such as the keyboard or is specified by the other manner. As the ending condition, for example, the following conditions can be adopted:

(A) The number of objects stored in the object storage section 11 is equal to or less than a preset value L, and (B) The maximum of the similarity degrees stored in the similarity degree storage section 12 is equal to or less than a preset value θ.

The merging object selecting section 23 selects the two objects from the objects stored in the object storage section 11, based on the similarity degrees stored in the similarity degree storage section 12 as the merging objects (Step A3).

Here, a selection method is, for example, to select two documents having the greatest similarity degree stored in the similarity degree storage section 12.

The new object generating section 24 combines or couples two merging objects to generate a new object (Step A4). The merging object removing section 25 removes the two selected merging objects from the object storage section (Step A5). Also, the merging object removing section 25 removes the similarity degree between each of the two selected merging objects and each of the other objects from the similarity degree storage section 12 (Step A6). The new object adding section 26 calculates the similarity degree between the new object and each of the objects stored in the object storage section 11, and adds and stores the calculated similarity degree in the similarity degree storage section 12 (Step A7). Also, the new object adding section 26 stores the new object in the object storage section 11 (Step A8).

When the operation ends, the object stored in the object storage section 11 may be outputted to the output unit such as a display. Also, a storage section other than the object storage section 11 may be provided to store the ID of the origin object and the contents or a set of the ID of the original object and the ID of the new object such that a relation of the new object and the original object is displayed as a dendrogram. Also, for the description, the object ID and the contents of the object are stored in the object storage section 11 in this example, but (the contents of) the object may be stored with a file name of the object ID.

Next, the effect of the first exemplary embodiment will be described. In the first exemplary embodiment, because the clustering is carried out to extract an object which is characteristic although the number of times of appearance of the object is less, the similarity degree is calculated by the method of approximating the Kolmogorov complexity. For example, it is supposed that two merging objects are the object i and the object j, the object i consists of a part A and a part B, and that the object j consists of the part A and a part C. If the objects are clustered by using the single linkage method, the single linkage method neither generate a new object and nor remove an origin object. As shown in the following equation (3), the objects having the highest similarity degree and contained in the clusters P and Q are selected, and the similarity degree between the selected objects is set as an inter-cluster similarity degree.

$$d(P, Q) = \max_{i \cdot P, y \cdot Q} d(i, j) \quad (3)$$

Therefore, when there is an object with a part B' having the extremely high similarity degree to the part B, a high similarity degree between the object and the cluster is calculated. Therefore, as described in Non-Patent Literature 2, as the number of objects contained in the cluster increases, the candidacies possible to be selected as the objects with the highest similarity degree increase and the objects contained in the cluster are easily selected to merge. As a result, the stair stepping structure, in which there are mainly merged objects in the cluster and some objects except it, is arbitrarily generated and appropriate clustering cannot be performed.

On the other hand, in the first exemplary embodiment of the present invention, after two merging objects are coupled or concatenated to generate a new object, a similarity degree between the new object and each of the other objects is calculated to select the next merging objects. Therefore, as the objects contained in the cluster increase, the objects with the highest similarity degree are easy to be selected. For example, an object having a part A' with a relatively higher similarity degree to the object having the part A contained in the cluster is easier to be selected than the object having a part B' with a very high similarity degree to the object having the part B.

In this way, in the first exemplary embodiment, it is possible to appropriately carry out the clustering such that an object which is characteristic although the number of times of appearance is less can be extracted. Also, in the first exemplary embodiment, because the data of the whole of objects are used through compression, when the object is a document, the similarity degree can be calculated without excluding general words and special words even if the number of words is large. Therefore, it is possible to carry out the clustering even if composite words as general words and special words are present.

Second Exemplary Embodiment

Figure 9:
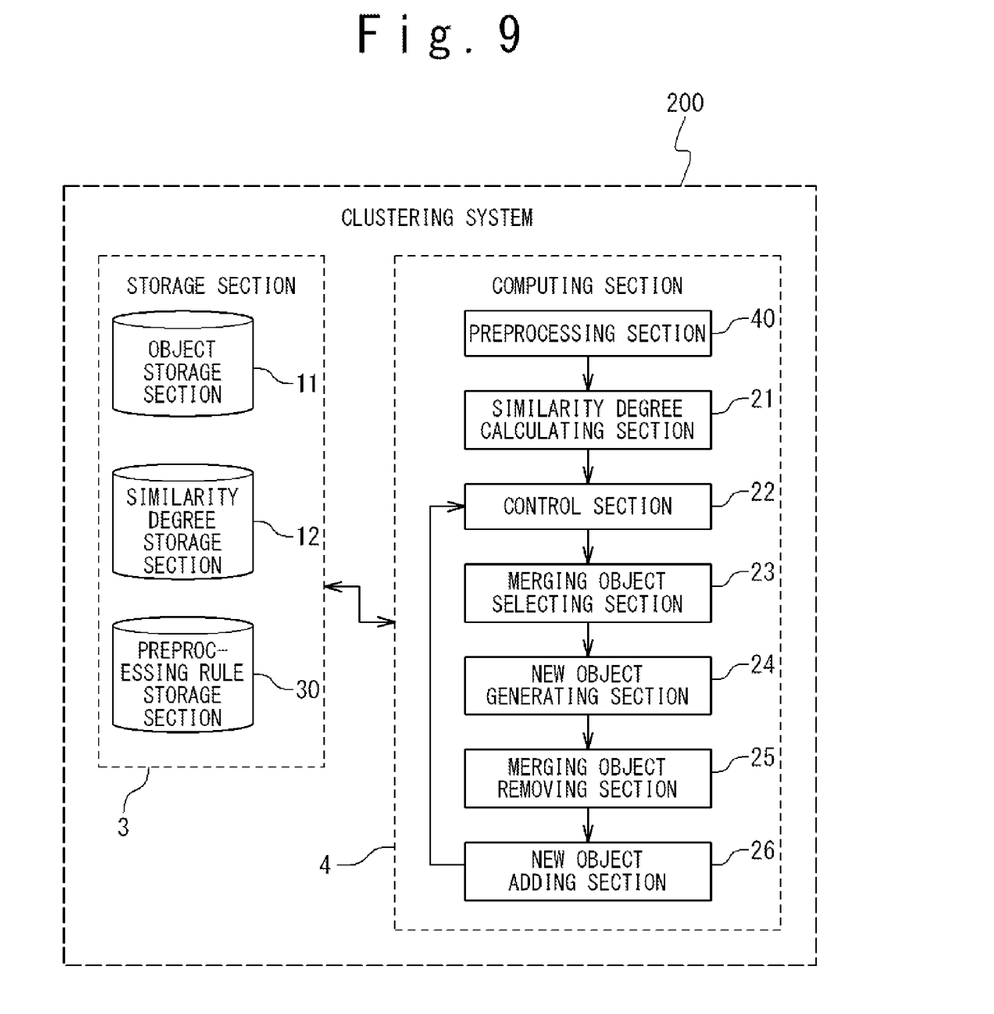
FIG. 9 is a block diagram showing the configuration of the clustering system according to a second exemplary embodiment of the present invention.

FIG. 9 is a block diagram showing the configuration of the clustering system according to a second exemplary embodiment of the present invention. The clustering system 200 in the present exemplary embodiment is provided with a storage section 3 and a computing section 4. The storage section 3 is provided with a preprocessing rule storage section 30, in addition to the object storage section 11 and the similarity degree storage section 12. The computing section 4 is provided with a preprocessing section 40, in addition to the similarity degree calculating section 21, the control section 22, the merging object selecting section 23, the new object generating section 24, the merging object removing section 25, and the new object adding section 26. The object storage section 11, the similarity degree storage section 12, the similarity degree calculating section 21, the control section 22, the merging object selecting section 23, the new object generating section 24, the merging object removing section 25, and the new object adding section 26 are the same as those in the first exemplary embodiment.

Figure 10:
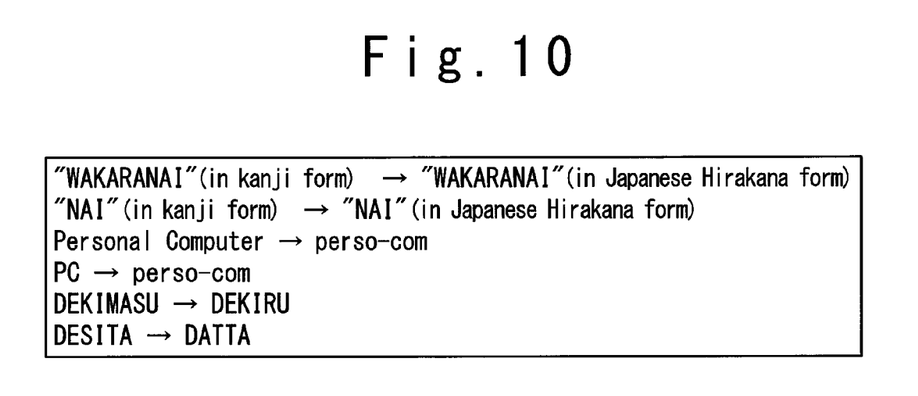
FIG. 10 is a diagram showing an example of a preprocessing rule.

The preprocessing rule storage section 30 stores a preprocessing rule for unifying a representation format of the object. The preprocessing rule may be previously stored in the system and may be specified by the user of the system through the input unit such as the keyboard or may be specified by the other manner. An example of the preprocessing rule when the object is a document is shown in FIG. 10. As shown in the FIG. 10, the kanji expression format is unified into the hiragana expression format as in "分からない" to "わからない" ("WAKARANAI" in Kanji form to "WAKARANA" in Japanese Hirakana form (different expression in same phonetic expression and same meaning)), and "無い" to "ない" ("NAI" in KANJI form to "NAI" in Japanese Hirakana form). Also, various expressions having same meaning are unified to a same form as in "personal computer→perso-com", "PC→perso-com". Also, unification between Japanese polite form and plain form is carried out as in "DEKIMASU" to "DEKIRU" and "DESITA" to "DATTA".

Figure 11:
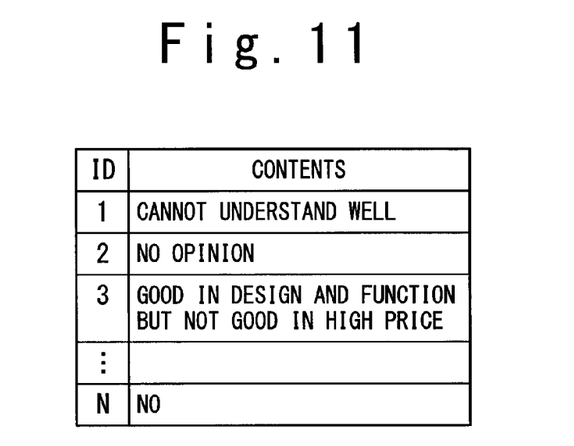
FIG. 11 is a diagram showing an example of the object storage section 11 when the preprocessing rule is applied.

The preprocessing section 40 converts the objects stored in the object storage section 11 based on the preprocessing rule stored in the preprocessing rule storage section 30 and overwrites the conversion result in the object storage section 11. An example when the object of FIG. 2 is converted and stored in the storage section 11 is shown in FIG. 11. In FIG. 11, the conversion is carried out as in "分からない" to "わからない" and "無い" to "ない".

It should be noted that although the case that the object is document data has been shown as an example, the preprocessing rule can be specified similarly, even if the object is image data and time-series data. For example, the preprocessing rule when the object is the image data is such as conversion of image resolution into 100 ppi (pixels per inch). For example, the preprocessing rule when the object is the time-series data is such as conversion of the format of a numerical value to be displayed into a same format.

Figure 12:
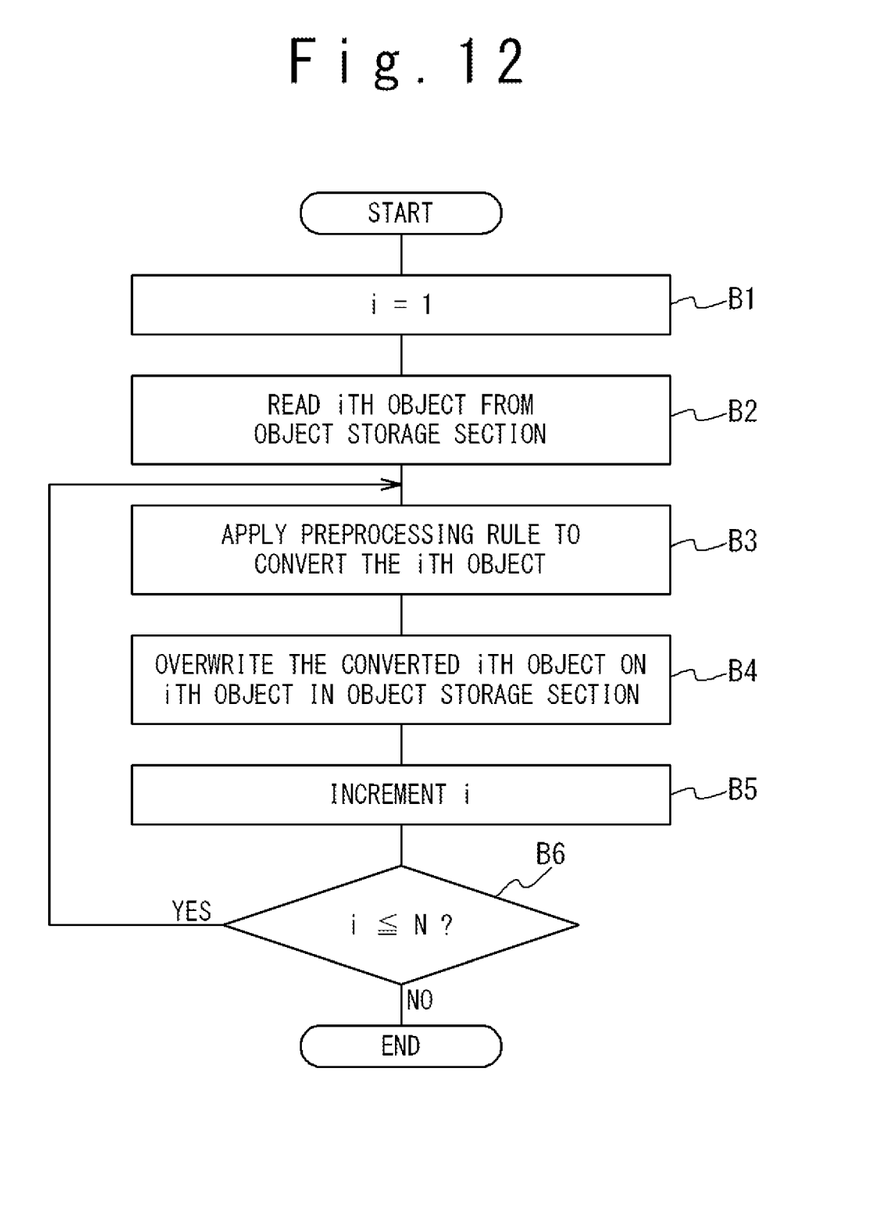
FIG. 12 is a flow chart showing an operation of the preprocessing section of the clustering system according to the second exemplary embodiment of the present invention.

Next, the operation will be described. FIG. 12 is a flow chart showing an example of the preprocessing section 40 in the clustering system of the present exemplary embodiment. For example, if the preprocessing rule is previously stored in the system, it is specified by the user of the system through the input unit such as the keyboard, or it is specified by another manner, the preprocessing section 40 of the clustering system operates as described below. It should be noted that when a word which is peculiar to a concerned region and so on are previously known, it may be inputted as the preprocessing rule by the user of the system through an input unit such as a keyboard.

First, a variable i showing an identification no. of one of the objects stored in the object storage section 11 is initialized to 1 (Step B1 of FIG. 12). Then, the contents of the object i as the $i^{th}$ object of the objects stored in the object storage section 11 are read (Step B2). The preprocessing rule is applied to the object i and converted (Step B3). The converted object i is overwritten as the contents of the $i^{th}$ object in the object storage section 11 (Step B4). The variable i is incremented (Step B5). The variable i is compared with the number N of the objects (Step B6), and the control flow returns to Step B3 if i is equal to or less than N, and the operation of the preprocessing section 40 is ended if exceeds N.

Next, the effect of the second exemplary embodiment will be described. In the second exemplary embodiment, by unifying the expression format of the object through the preprocessing, the object whose expression format has not been unified can be clustered appropriately.

Next, an example is shown when the clustering system according to the first and second exemplary embodiments is applied to acquisition of requests from the interview result. In this interview, while showing a new office environment to each of examinees, an interviewer questioned how he would feel the office environment to the examinee, and a recording secretary (continuity person) recorded it. 101 documents of about 9,000 words in total are acquired. The interviewer questioned three previously determined themes but without persisting in the themes too much to extract the request widely so as to make the examinee relax. Also, the recording secretary recorded ambiguous and un-formal conversation used by interviewer and the examinee just as it is. Supposing that a theme to be verified is unknown, after the preprocessing rule shown in FIG. 10 is applied to unify the expression formats of generally used terminologies, 101 documents in total are clustered into five new objects through the process described in the first exemplary embodiment, and the words which are contained more in each of the five new objects are extracted. As a result, all of three key words which represent the three themes could be extracted.

Next, for comparison, after the preprocessing described in the second exemplary embodiment is performed, the clustering was carried out in accordance with the Ward's method by using the same similarity degree as described in the first exemplary embodiment. The Ward's method is described in Non-Patent Literature 1, and is a technique in which the similarity degree is assumed to be a Euclid distance. An appropriate clustering result can be generally obtained often by this method. On the other hand, the similarity degree described in the first exemplary embodiment is not Euclid distance. When it is tested whether or not the clustering can be carried out by applying the Ward's method to the above-described interview result, only one of the key words showing three themes could be extracted.

The present invention is applied to the clustering system, in which the object which is characteristic although the number of times of appearance of the object is less is extracted, in the analysis of the customer opinions in the market the call center and so on, and the acquisition and analysis of requests of stakeholders. Also, the present invention can be applied to the clustering system in which the expression format is not unified in analysis of the customer opinions in the market, the call center and so on and the acquisition and analysis of the requests of stakeholders.

As such, the present invention has been described by use of the exemplary embodiments. It would be apparent to a person in the art that these embodiments are merely given to explain the present invention, and they should not be referred to limit the scope of the present invention.

The present invention claims a priority on convention based on Japanese Patent Application No. 2009-095618 filed on Apr. 10, 2009. The disclosure thereof is incorporated herein by reference.

The invention claimed is:

1. A clustering apparatus comprising:
a processor;
a computer memory;
a similarity degree calculating section configured to calculate a similarity degree of a combination of optional two of a plurality of objects to store the calculated similarity degree in a similarity degree table in the computer memory, wherein
    the combination excluding combining of one of the optional two objects and itself, and
    the similarity degree being calculated based on an approximate calculation method of Kolmogorov complexity;
a merging object selecting section configured to select as merging objects two related objects having a particular similarity degree which satisfies a predetermined reference;
a new object generating section configured to generate a new object from the merging objects by concatenating the two related objects selected as the merging objects, wherein the new object fully incorporates each of the two related objects;
a merging object removing section configured to remove from the similarity degree table, the particular similarity degree between each of the two related objects selected as the merging objects and each of the plurality of objects; and
a new object adding section configured to calculate a new similarity degree between the new object and each of the remaining of the plurality of objects other than the new object, wherein
    the selecting, the generating, the removing are repeated with respect to the new object based at least on the calculated new similarity degree satisfies the predetermined preference,
    the processor causes at least one of the similarity degree calculating section, the merging object selecting section, the new object generating section, the merging object removing section, and the new object adding section to perform the respective calculating, selecting, generating, removing, and calculating, and
    each of the plurality of objects is document data.

2. The clustering apparatus according to claim 1, wherein the merging object selecting section selects the two related objects for a highest similarity degree stored in the similarity degree table as the merging objects.

3. The clustering apparatus according to claim 1, wherein the approximate calculation method is carried out based on a size of compression data obtained by compressing each of the two related objects by a predetermined compression method and a size of compression data obtained by compressing a coupled object obtained by coupling the two related objects by the predetermined compression method.

4. The clustering apparatus according to claim 3, wherein the merging object selecting section selects the two related objects for a highest similarity degree stored in the similarity degree table as the merging objects.

5. A clustering method comprising:
calculating a similarity degree of a combination of optional two of a plurality of objects to store the calculated similarity degree in a similarity degree table in a storage unit, wherein
the combination excluding combining of one of the two optional objects and itself, and
the similarity degree being calculated based on an approximate calculation method of Kolmogorov complexity;
selecting as merging objects, two related objects having a particular similarity degree which satisfies a predetermined reference;
generating a new object from the merging objects by concatenating the two related objects selected as the merging objects, wherein the new object fully incorporates each of the two related objects;
removing from the similarity degree table, the particular similarity degree between each of the two related objects selected as the merging objects and each of the plurality of objects; and
calculating a new similarity degree between the new object and each of the remaining of the plurality of objects other than the new object;
repeating the selecting, the generating, the removing with respect to the new object based at least on the calculated new similarity degree satisfies the predetermined preference,
wherein each of the plurality of objects is document data.

6. The clustering method according to claim 5, wherein the two objects for a higher similarity degree stored in the similarity degree table are selected as the merging objects.

7. The clustering method according to claim 5, wherein the approximate calculation method is carried out based on a size of compression data obtained by compressing each of the two related objects by a predetermined compression method and a size of compression data obtained by compressing a coupled object obtained by coupling the two related objects by the predetermined compression method.

8. A computer-readable non-transitory storage medium which stores a computer-executable program code for achieving a clustering method which comprises:
calculating a similarity degree of a combination of optional two of a plurality of objects to store the calculated similarity degree in a similarity degree table in a storage unit, wherein
the combination excluding combining of one of the two optional objects and itself, and
the similarity degree being calculated based on an approximate calculation method of Kolmogorov complexity;
selecting as merging objects, two related objects having a particular similarity degree which satisfies a predetermined reference;
generating a new object from the merging objects by concatenating the two related objects selected as the merging objects, wherein the new object fully incorporates each of the two related objects;
removing from the similarity degree table, the particular similarity degree between each of the two related objects selected as the merging objects and each of the plurality of objects; and
calculating a new similarity degree between the new object and each of the remaining of the plurality of objects other than the new object;
repeating the selecting, the generating, the removing with respect to the new object based at least on the calculated new similarity degree satisfies the predetermined preference,
wherein each of the plurality of objects is document data.

9. The computer-readable non-transitory storage medium according to claim 8, wherein the selecting comprises:
selecting as the merging objects, the two related objects for a higher similarity degree stored in the similarity degree table.

10. The computer-readable non-transitory storage medium according to claim 8, wherein the approximate calculation method is carried out based on a size of compression data obtained by compressing each of the two related objects by a predetermined compression method and a size of compression data obtained by compressing a coupled object obtained by coupling the two related objects by the predetermined compression method.

* * * * *